(12) United States Patent
Kibol (10) Patent No.: US 7,530,240 B2
(45) Date of Patent: May 12, 2009

(54) METHOD FOR PRODUCING HIGH-SILICATE INORGANIC FIBERS OF ROCKS

(75) Inventor: Viktor F Kibol, Kiev (UA)

(73) Assignees: Viktor F. Kibol, Kiev (UA); Roman V. Kibol, Kiev (UA); Oleksandr B. Biland, Kiev (UA); Suano Nakanoo, Tokyo (JP); Fukaishi Takao, Tokyo (JP)

( * ) Notice: Subject to any disclaimer, the term of this patent is extended or adjusted under 35 U.S.C. 154(b) by 761 days.

(21) Appl. No.: 10/517,215

(22) PCT Filed: Apr. 21, 2003

(86) PCT No.: PCT/UA03/00013

§ 371 (c)(1),
(2), (4) Date: Dec. 3, 2004

(87) PCT Pub. No.: WO03/104156

PCT Pub. Date: Dec. 18, 2003

(65) Prior Publication Data

US 2005/0223752 A1    Oct. 13, 2005

(30) Foreign Application Priority Data

Jun. 6, 2002    (UA)    ............................ 2002064644

(51) Int. Cl.
C03B 37/02    (2006.01)
(52) U.S. Cl. .............................. 65/474; 65/482; 65/475
(58) Field of Classification Search .................... 65/474, 65/475, 479, 533, 539, 482
See application file for complete search history.

(56) References Cited

U.S. PATENT DOCUMENTS 1,912,811 A * 6/1933 Wechter ...................... 106/739

2,594,799 A * 4/1952 Powell ......................... 65/456

FOREIGN PATENT DOCUMENTS

| RU | 1831856 | 3/1995 |
| RU | 2118300 | 11/1996 |
| RU | 2102342 | 1/1998 |
| UA | 10762 | 12/1996 |

* cited by examiner

OTHER PUBLICATIONS

Dzigiris, D.D.; Volynskij, A.K.; Kozlovskij, P.P.; Dem'yanenko, Yu.N.; Makhova, M.F.; Lizogub, G.M.; *"Fundamentals of Basalt Fibers Production Technology and Basalt Fibers Properties"* Collection of scientific papers: 1980, pp. 54-81.

*Primary Examiner*—Steven P Griffin
*Assistant Examiner*—Queenie Dehghan
(74) *Attorney, Agent, or Firm*—DeLio & Peterson, LLC; Peter W. Peterson (57) ABSTRACT

The present inventions relate to the means of production of high-silicate inorganic fibers of natural acidic rock minerals and also to products manufactured of said fibers, namely: continuous, staple fibers and scaly particles. In each variant of the M dacite or rhyodacite, granite or rhyolite, or a rock comprising mostly sand with silicon oxide content equal or exceeding 73% are used as a rock. The present inventions aim at proposing the means for producing inorganic fibers of natural acidic rock minerals and also the products manufactured of said fibers, namely: continuous, staple and coarse fibers and fine scaly particles having increased strength, corrosion and temperature resistance. This objective is attained by creating conditions for removing foreign inclusions, having high melting and boiling temperatures, from the melt by way of using rocks with higher silicon oxide ($SiO_2$) content and, therefore, higher melting points, as raw materials. This enables removal of most of foreign inclusions from the melted rock to the atmosphere.

1 Claim, 5 Drawing Sheets

METHOD FOR PRODUCING HIGH-SILICATE INORGANIC FIBERS OF ROCKS

BACKGROUND OF THE INVENTION

1. Field of the Invention

The present invention relates to the means of production of high-silicate inorganic continuous, staple and coarse fibers, and scaly particles of natural acidic rock minerals and also to products manufactured of said fibers, namely continuous, staple and coarse fibers and scaly particles.

2. Description of Related Art

The use of high-silicate inorganic fibers, made of natural acidic rocks, as raw materials, enables production of ecologically safe, resistant to atmospheric effects construction materials, which may serve as substitutes for asbestos, glass, metal, wood, etc. Therefore, the need in such materials is increasing.

In terms of silicon content, the rocks are divided into: ultrabasic (1), basic (2), medium (3), and acidic (4). There are many publications and patents, both national and foreign ones, describing methods and arrangements for obtaining inorganic fibers of rocks 1, 2, 3. Meanwhile, the author is not aware of any publications or patents describing methods and arrangements for obtaining inorganic fibers of acidic rocks (4). In fact, predominance of one of the main silicon (Si) oxides in the rock contents results in significantly altered properties of fibers obtained thereof, namely, in terms of strength, heat and chemical resistance. For example, high-silicate glass fiber S-2, which comprises over 95% of silica $SiO_2$ and is obtained by way of treating glass fiber with hot acid, is 40% stronger that the glass E with 55% content of $SiO_2$. Therefore, proposing means for using acidic rocks as raw materials, with a view to their almost inexhaustible deposits in the Earth, will enable production of high-module composite materials which would be much cheaper compared to cost intensive, expensive method of producing high-silicate glass fiber S.

There is known the method of producing continuous fiber of rocks, including the operations of rock fragmentation, melting in a melting furnace and drawing of continuous fiber from the melt through spinneret (Russian Federation Patent 2102342, IPC 6 C03B37/00, publication date 20 Jan. 1998). In the described method the rocks used are basalt group rocks, from basic to medium in contents, and the temperature in the furnace is in the range of 1500 to 1600° C.

The fibers produced with the use of this method have insufficient rupture strength due to presence of foreign inclusions with melting point higher than the melting temperature of the general mass of the rock.

A method of continuous high-silicate inorganic fibers production of rocks including the operations of fragmented rocks feeding to a melting furnace, rock melting, melt homogenization, further stabilization of the melt in the melting furnace feeder, fiber drawing, lubricating and winding onto bobbins is disclosed in Ukraine Patent No. 10762, IPC 6 C03B 37/00, publication date 25 Dec. 1998, bulletin No. 6.

The drawback of the described method is in that continuous fibers produced of andesite rock using this method have insufficient rupture strength caused by the presence of foreign inclusions, which can not be removed from the melt due to insufficient temperature range limited by the boiling point of the general mass of fractured rock. Such insufficient strength causes decreasing of the fibers length, their breaking in the process of winding onto bobbin, which limit the technological potential of the method.

A method of staple fibers production of rocks including the operations of fragmented rocks feeding to a melting furnace, rock melting, melt homogenization, further stabilization of the melt in the melting furnace feeder, and obtaining the staple fiber of melt flowing out of spinneret is disclosed in D. D. Dzhigiris, A. K. Volynskyi, P. P. Kozlovskyi, Yu. N. Dem'yanenko, M. F. Makhova, G. M. Lizogub. Fundamentals of basalt fibers production technology and basalt fibers properties.—In the collection of scientific papers: Basalt fiber composite materials and structures.—Kiev: Naukova Dumka.—1980—P. 54-81.

The drawback of the described method is in that staple fibers produced with the use of this method have insufficient rupture strength caused by the presence of foreign inclusions, which can not be removed from the melt due to insufficient temperature range used that is limited by the boiling point of the general mass of fractured rock. Such insufficient strength causes decreasing of the fibers length, which limit the technological potential of the method.

A method including the operations of fragmented rocks feeding to a melting furnace, melting, melt homogenization, further stabilization of the melt in the melting furnace feeder, and obtaining the scaly particles of melt flowing out of spinneret is disclosed in Russian Federation Patent No. 1831856, IPC 6 C03B37/02, B22F9/02, publication date 27 Mar. 1995, bulletin No. 9.

The drawback of the described method is in that scaly particles produced according to this method have insufficient chemical resistance and rupture strength caused by the presence of foreign inclusions, which can not be removed from the melt due to insufficient temperature range used that is limited by the boiling point of the general mass of fractured rock. Such insufficient strength and chemical resistance limit the technological potential of the method. Another drawback of the method is impossibility to control fractional composition of scaly particles obtained. Thus, the output percentage of homogenous fraction of needed dispercity and thickness of scaly particles turns to be low.

A production line comprising rock dosing unit, melting furnace, feeder, spinneret with the feeder for outputting the fiber, mechanism for applying a lubricant onto fibers and bobbin for winding the fibers is disclosed in Russian Federation Patent No. 2118300, IPC 6 C03B 37/00, publication date 27 Aug. 1998.

The drawback of the described production line is in insufficient strength of fibers produced thereon. The reason is primarily in melting furnace operating temperature range limited by 1450° C. At this temperature it is not possible to remove inclusions from the melt. After obtaining and cooling the fibers such inclusions become tension concentrators and cause early destruction of a fiber, for instance, when a fiber is wound on a bobbin.

Continuous fiber produced of natural rock materials is disclosed in Ukraine Patent No. 10762, IPC 6 C03B 37/00, publication date 25 Dec. 1998, bulletin No. 6.

Described fibers have insufficient rupture strength due to foreign inclusions present there.

Staple fiber produced of rocks is disclosed in D. D. Dzhigiris, A. K. Volynskyi, P. P. Kozlovskyi, Yu. N. Dem'yanenko, M. F. Makhova, G. M. Lizogub. Fundamentals of basalt fibers production technology and basalt fibers properties.—In the collection of scientific papers: Basalt fiber composite materials and structures.—Kiev: Naukova Dumka.—1980—P. 54-81.

But it does not appear possible to produce staple fiber of acidic rocks according to the proposed method due to low temperature in the furnace and large quantity of foreign inclusions.

Described staple fibers have large quantity of non-fibrous inclusions and insufficient length of fibers, which limit the technological potential of described staple fibers.

Fine scaly particles produced of natural rock materials are disclosed in Russian Federation Patent No. 1831856, IPC 6 C03B37/02, B22F9/02, publication date 27 Mar. 1995, bulletin No. 9.

Described fine scaly particles have insufficient strength due to foreign inclusions present therein.

SUMMARY OF THE INVENTION

The present inventions aim at proposing the means for producing inorganic fibers of natural acidic rock minerals and also the products manufactured of said fibers, namely: continuous, staple and coarse fibers and scaly particles possessing increased rupture strength, corrosion and temperature resistance. This objective is attained by creating conditions for removing foreign inclusions, having high melting and boiling temperatures, from the melt by way of using rocks with high $SiO_2$ content and, therefore, higher melting points, as raw materials. This enables heating until removing of most of foreign inclusions from the melted rock.

The objective is attained by the first variant of the proposed method, which, like the known method of producing inorganic continuous fibers of rock, comprises operations of loading fractured rocks to melting furnace, rocks melting, melt homogenization, further stabilization of melt in melting furnace feeder, fiber drawing, lubricating and winding onto a bobbin, wherein, according to the invention, dacite or rhyodacite is used as a rock, prior to loading to the melting furnace the rock is heated up to temperature between 700 and 910° C., kept at this temperature during 5 to 15 minutes until removal of chemically bound water and burning up organic components, then the rock is subjected to mechanical-catalytical activation until obtaining particles of not more than 15 μm in size and is heated to temperature between 2105 and 2200° C. until obtaining the melt with amorphism degree of not less than 96% and isolation of not melted quartzites from the melt, further homogenization and stabilization of the melt are performed at the temperature 1420 to 1710° C. until obtaining the melt with viscosity being not less than 130 decipoise, and fibers are drawn from the melt zone located below the surface layer.

The objective is also attained by the second variant of the proposed method, which, like the known method of producing staple fibers of rock, comprises operations of loading fractured rocks to melting furnace, rocks melting, melt homogenization, further stabilization of melt in melting furnace feeder and obtaining staple fiber from the melt flowing out of spinneret, wherein, according to the invention, dacite or rhyodacite is used as a rock, prior to loading to the melting furnace the rock is heated up to temperature between 700 and 910° C. and kept at this temperature during 5 to 15 minutes until removal of chemically bound water and burning up organic components, then the rock is subjected to mechanical-catalytical activation until obtaining particles of not more than 15 μm in size and is heated to temperature between 2105 and 2200° C. until obtaining the melt with amorphism degree not less than 96% and isolation of not melted quartzites from the melt, further homogenization and stabilization of the melt are performed at the temperature 1420 to 1710° C. until obtaining the melt with viscosity not less than 130 decipoise, and staple fibers are obtained by way of inflating the melt flowing out of the spinneret.

The objective is also attained by the third variant of the proposed method, which, like the known method of producing inorganic fine scaly particles of rock, comprises operations of loading fractured rocks to melting furnace, rocks melting, melt homogenization, further stabilization of melt in melting furnace feeder and obtaining scaly particles from the melt flowing out of spinneret, wherein, according to the invention, dacite or rhyodacite is used as a rock, prior to loading to the melting furnace the rock is heated up to temperature between 700 and 910° C. and kept at this temperature during 5 to 15 minutes until removal of chemically bound water and organic components burning up, then the rock is subjected to mechanical-catalytical activation until obtaining particles of not more than 15 μm in size and is heated to temperature between 2105 and 2200° C. until obtaining the melt with amorphism degree not less than 96% and isolation of not melted quartzites from the melt, further homogenization and stabilization of the melt are performed at the temperature 1420 to 1710° C. until obtaining the melt with viscosity being not less than 130 decipoise, and scaly particles are obtained by way of fracturing the melt stream flowing out of the spinneret.

The authors have experimentally determined the optimum operating conditions for implementation of the methods of producing high-silicate inorganic continuous, staple fibers and fine scaly particles of rocks of dacite or rhyodacite type. In particular, in case of heating the raw material to temperature below 700° C. and keeping it for less than 5 minutes, the quality of fibers and fine scaly particles so obtained turns to be lower than required, because further obtained melt will contain unmelted, fragile inclusions sparingly soluble in the melt, which significantly decrease the quality of the product obtained. Preliminary heating at the temperature over 910° C. during more than 15 minutes is not justified economically. Obtaining the particles with the size over 15 μm in the process of mechanical-catalytical treatment would complicate preparing of a homogenous melt and result in higher further costs for its heating in order to obtain the melt. Temperatures below 2105° C. at the stage of obtaining the melt do not lead to removing most of foreign solid inclusions, namely quartzites, from the melt and producing the melt with optimum amorphism degree, i.e. not less than 96%. Heating up to the temperature over 2200° C. have practically no effect on quality of the product obtained and, therefore, is not justified economically. It is practically impossible to produce homogenized and stable melt with optimum viscosity, i.e. not less than 130 decipoise, at the temperature below 1420° C., while heating up to the temperature over 1710° C. shortens the feeder and spinneret service life because the melt contains active substances causing destruction of feeder refractory materials into particles which obstruct (block up) the spinnerets.

The objective is also attained by the fourth variant of the proposed method, which, like the known method of producing high-silicate inorganic continuous fibers of rock, comprises operations of loading fractured rocks to melting furnace, rocks melting, melt homogenization, further stabilization of melt in melting furnace feeder, fiber drawing, lubricating and winding onto a bobbin, wherein, according to the invention, granite or rhyolite is used as a rock, prior to loading to the melting furnace the rock is heated up to temperature between 750 and 950° C. and kept at this temperature during 20 to 30 minutes until fracturing of conglomerates and removal of water vapors, then the rock is subjected to mechanical-catalytical activation until obtaining particles of not more than 10 μm in size and is heated to temperature between 2110 and 2500° C. until obtaining the amorphous melt, further homogenization and stabilization of the melt are performed at the temperature 1500 to 1750° C. until obtaining the melt with viscosity being not less than 145 decipoise, and fibers are drawn from the melt zone located below the surface layer.

The objective is also attained by the fifth variant of the proposed method, which, like the known method of producing staple fibers of rock, comprises operations of loading fractured rocks to melting furnace, rocks melting, melt homogenization, further stabilization of melt in melting furnace feeder, obtaining of the staple fiber of the melt flowing out of the spinneret, wherein, according to the invention, granite or rhyolite is used as a rock, prior to loading to the melting furnace the rock is heated up to temperature between 750 and 950° C. and kept at this temperature during 20 to 30 minutes until fracturing of conglomerates and removal of water vapors, then the rock is subjected to mechanical-catalytical activation until obtaining particles of not more than 10 μm in size and is heated to temperature between 2110 and 2500° C. until obtaining the amorphous melt, further homogenization and stabilization of the melt are performed in the melting furnace feeder at the temperature 1500 to 1750° C. until obtaining the melt with viscosity being not less than 145 decipoise, and staple fibers are obtained by way of inflating the melt flowing out of the spinneret.

The objective is also attained by the sixth variant of the proposed method, which, like the known method of producing high-silicate inorganic fine scaly particles of rock, comprises operations of loading fractured rocks to melting furnace, rocks melting, melt homogenization, further stabilization of melt in melting furnace feeder and obtaining of the scaly particles of the melt flowing out of the spinneret, wherein, according to the invention, granite or rhyolite is used as a rock, prior to loading to the melting furnace the rock is heated up to temperature between 750 and 950° C. and kept at this temperature during 20 to 30 minutes until fracturing of conglomerates and removal of water vapors, then the rock is subjected to mechanical-catalytical activation until obtaining particles of not more than 10 μm in size and is heated to temperature between 2110 and 2500° C. until obtaining the amorphous melt, further homogenization and stabilization of the melt are performed in the melting furnace feeder at the temperature 1500 to 1750° C. until obtaining the melt with viscosity being not less than 145 decipoise, and scaly particles are obtained by way of fracturing the melt stream flowing out of the spinneret.

The authors have experimentally determined the optimum operating conditions for implementation of the methods of producing high-silicate inorganic continuous, staple fibers and fine scaly particles of rocks of granite or rhyolite type. In particular, in case of heating the raw material up to temperature below 750° C. and keeping it for less than 20 minutes, the quality of fibers and fine scaly particles so obtained turns to be lower than required, because further obtained melt will contain unmelted, fragile inclusions sparingly soluble in the melt, which significantly decrease the quality of the product obtained. Preliminary heating at the temperature over 950° C. during more than 30 minutes is not justified economically. Obtaining the particles with the size over 10 μm in the process of mechanical-catalytical treatment would complicate preparing of a homogenous melt and result in higher further costs for its heating in order to obtain the melt. Temperatures below 2110° C. at the stage of obtaining the melt do not lead to removing most of foreign solid inclusions, namely quartzites, from the melt and producing the amorphous melt. Heating at the temperature over 2500° C. have practically no effect on quality of the product obtained and, therefore, is not justified economically. It is practically impossible to produce homogenized and stable melt with optimum viscosity, i.e. not less than 145 decipoise, at the temperature below 1500° C., while heating at the temperature over 1750° C. shortens the feeder and spinnerets service life because the melt contains substances which obstruct the spinnerets.

The objective is also attained by the seventh variant of the proposed method, which, like the known method of producing high-silicate inorganic continuous fibers of rock, comprises operations of loading fractured rocks to melting furnace, rocks melting, melt homogenization, further stabilization of melt in melting furnace feeder, fiber drawing, lubricating and winding onto a bobbin, wherein, according to the invention, sand predominated rock with silicon oxide content equal or exceeding 73% is used as a rock, prior to loading to the melting furnace the sand is heated up to temperature between 100 and 450° C. and kept at this temperature during 30 to 60 minutes until removal of bound water and gaseous inclusions, heated raw material is subjected to mechanical-catalytical activation until obtaining particles of not more than 5 μm in size, then the raw material is heated up to temperature between 2115 and 2550° C. and kept at this temperature until obtaining the amorphous melt, homogenization and stabilization of the melt are performed at the temperature 1440 to 1730° C. until obtaining the melt with viscosity not less than 160 decipoise, and fibers are drawn from the melt zone located below the surface layer.

The objective is also attained by the eighth variant of the proposed method, which, like the known method of producing staple fibers of rock, comprises operations of loading fractured rocks to melting furnace, rocks melting, melt homogenization, further stabilization of melt in melting furnace feeder, obtaining staple fiber from the melt flowing out of spinneret, wherein, according to the invention, sand predominated rock with silicon oxide content equal or exceeding 73% is used as a rock, prior to loading to the melting furnace the sand is heated up to temperature between 100 and 450° C. and kept at this temperature during 30 to 60 minutes until removal of bound water and gaseous inclusions, heated raw material is subjected to mechanical-catalytical activation until obtaining particles of not more than 5 μm in size, then the raw material is heated up to temperature between 2115 and 2550° C. and kept at this temperature until obtaining the amorphous melt, homogenization and stabilization of the melt are performed in the melting furnace feeder at the temperature 1440 to 1730° C. until obtaining the melt with viscosity not less than 160 decipoise, and staple fibers are obtained by way of inflating the melt flowing out of the spinneret.

The objective is also attained by the ninth variant of the proposed method, which, like the known method of producing high-silicate inorganic fine scaly particles of rock, comprises operations of loading fractured rocks to melting furnace, rocks melting, melt homogenization, further stabilization of melt in melting furnace feeder and obtaining scaly particles from the melt flowing out of spinneret, wherein, according to the invention, sand predominated rock with silicon oxide content equal or exceeding 73% is used as a rock, prior to loading to the melting furnace the sand is heated up to temperature between 100 and 450° C. and kept at this temperature during 30 to 60 minutes until removal of bound water and gaseous inclusions, heated raw material is subjected to mechanical-catalytical activation until obtaining particles not more than 5 μm in size, then the raw material is heated up to temperature between 2115 and 2550° C. and kept at this temperature until obtaining the amorphous melt, homogenization and stabilization of the melt are performed in the melting furnace feeder at the temperature 1440 to 1730° C. until obtaining the melt with viscosity not less than 160 decipoise, and scaly particles are obtained by way of fracturing the melt stream flowing out of the spinneret.

The authors have experimentally determined the optimum operating conditions for implementation of the methods of producing high-silicate inorganic continuous, staple fibers and fine scaly particles of sand predominated rock with silicon oxide content equal or exceeding 73%. In particular, in case of heating the raw material to temperature below 100° C. and keeping it for less than 30 minutes, the quality of fibers and fine scaly particles so obtained turns to be lower than required, because further obtained melt will contain unmelted, fragile inclusions sparingly soluble in the melt, which significantly decrease the quality of the product obtained. Preliminary heating at the temperature over 450° C. during more than 60 minutes is not justified economically. Obtaining the particles with the size over 5 μm in the process of mechanical-catalytical treatment would complicate preparing of a homogenous melt, because large sand particles are tension concentrators and result in higher further costs for heating in order to obtain the melt. Temperatures below 2115° C. at the stage of obtaining the melt do not lead to removing most of foreign solid inclusions from the melt and producing the amorphous melt. Heating at the temperature over 2550° C. have practically no effect on quality of the product obtained and, therefore, is not justified economically. It is practically impossible to produce homogenized and stable melt with optimum viscosity, i.e. not less than 160 decipoise, at the temperature below 1440° C., while heating at the temperature over 1730° C. shortens the feeder and spinnerets service life because the melt contains active substances causing destruction of feeder refractory materials into particles which obstruct (block up) the spinnerets.

The objective is attained by the first variant of the proposed production line, which, like the known production line for implementing the first, fourth and seventh variants of the method, comprises rock dosing unit, melting furnace, feeder equipped with the spinneret and the feeder for outputting the fiber, mechanisms for applying a lubricant, winding the fiber onto bobbin, preservation and storing of the fibers obtained, and means for technological process monitoring and control, wherein, according to the invention, the production line further comprises the arrangement for mechanical-catalytical processing of the raw material, heat exchanger installed on the dosing unit for rock preliminary heating, blending chamber, which comprises the case, bottom, adjustable valves on the input and output sides, intended for melt homogenization and stabilization, spinneret heater, while the input of the arrangement for mechanical-catalytical treatment of the raw material is connected with the output of the rock dosing unit, and the output of the arrangement is connected with the melting furnace input, melting furnace output is connected with the blending chamber input, the output of the blending chamber is connected with the feeder equipped with heated spinneret.

The objective is also attained by the second variant of the proposed production line, which, like the known production line for implementing the second, fifth and eighth variants of the method, comprises rock dosing unit, melting furnace, spinneret for outputting the staple fiber, mechanisms for preservation and storing of the staple fibers obtained, and means for technological process monitoring and control, wherein, according to the invention, the production line further comprises the arrangement for mechanical-catalytical processing of the raw material, heat exchanger installed on the dosing unit for rock preliminary heating, and means for inflating the melt stream flowing out of the spinneret, while the input of the arrangement for mechanical-catalytical treatment of the raw material is connected with the output of the rock dosing unit, and the output of the arrangement is connected with the melting furnace input, melting furnace output is connected with the spinneret.

The objective is also attained by the third variant of the proposed production line, which, like the known production line for implementing the third, sixth and ninth variants of the method, comprises rock dosing unit, melting furnace, spinneret for outputting the high-silicate inorganic fine scaly particles, mechanisms for preservation and storing of the high-silicate inorganic fine scaly particles obtained, and means for technological process monitoring and control, wherein, according to the invention, the production line further comprises the arrangement for mechanical-catalytical processing of the raw material, heat exchanger installed on the dosing unit for rock preliminary heating, and means for fracturing the melt stream flowing out of the spinneret, while the input of the arrangement for mechanical-catalytical treatment of the raw material is connected with the output of the rock dosing unit, and the output of the arrangement is connected with the melting furnace input, melting furnace output is connected with the spinneret.

The objective is attained by the first variant of the proposed continuous fiber, which, like the known one, is produced of natural rock materials, and the fiber according to the invention is made of dacite or rhyodacite.

The objective is also attained by the second variant of the proposed continuous fiber, which, like the known one, is produced of natural rock materials, and the fiber according to the invention is made of granite or rhyolite.

The objective is also attained by the third variant of the proposed continuous fiber, which, like the known one, is produced of natural rock materials, and the fiber according to the invention is made of sand predominated rock with silicon oxide content equal or exceeding 73%.

The objective is attained by the first variant of the proposed staple fiber, which, like the known one, is produced of natural rock materials, and the fiber according to the invention is made of dacite or rhyodacite.

The objective is also attained by the second variant of the proposed staple fiber, which, like the known one, is produced of natural rock materials, and the fiber according to the invention is made of granite or rhyolite.

The objective is also attained by the third variant of the proposed staple fiber, which, like the known one, is produced of natural rock materials, and the fiber according to the invention is made of sand predominated rock with silicon oxide content equal or exceeding 73%.

The objective is attained by the first variant of the proposed high-silicate inorganic fine scaly particles, which, like the known ones, are produced of natural rock materials, and the particles according to the invention are made of dacite or rhyodacite.

The objective is also attained by the second variant of the proposed high-silicate inorganic fine scaly particles, which, like the known ones, are produced of natural rock materials, and the particles according to the invention are made of granite or rhyolite.

The objective is also attained by the third variant of the proposed high-silicate inorganic fine scaly particles, which, like the known ones, are produced of natural rock materials, and the particles according to the invention are made of sand predominated rock with silicon oxide content equal or exceeding 73%.

The proposed method may be implemented in case of use of acidic rock as raw material, such acidic rock being dacite or rhyodacite, granite or rhyolite, and also sand predominated rock with silicon oxide content equal or exceeding 73%, while said rock proportion in the volume of raw materials input to the production line exceeds 70%.

The raw material used, i.e. fractured rock, has various inclusions, also the inclusions with melting point over 1400° C. The influence of these inclusions on the obtained product may be observed, in most of cases, only after producing the fibers. Therefore, it is very important to remove these inclusions prior to production of continuous, staple fibers and fine scaly particles. Sometimes said inclusions are present in the raw material in a bound form, therefore, exposing it to mechanical-catalytical treatment enables breaking of the bounds between the substances in the parent material containing foreign inclusions and prepares the raw material to their removal. In case of heating at the temperature approximately 1200 to 1400° C., such inclusions may remain in the melt. But the experiments have proved that most of said inclusions decompose when the melt temperature is increased to 2100-2550° and the melt is kept at this temperature during 10 to 60 minutes. The idea of the proposed solution is to create conditions for weakening of the crystal lattice of the fractured rock i.e. raw material, by way of its mechanical-catalytical treatment and further quick heating up to the temperatures exceeding 2100° C.

Among the natural acidic rock materials the proposed materials have the following chemical composition (see Table 1).

High content of silicon oxide, high melting and boiling temperatures of the mentioned materials enable their use for producing very strong, temperature and corrosion resistant fibers, because upon attaining melting temperatures of these materials it becomes possible to remove unwanted impurities, which have lower melting points, block up the spinnerets used in forming continuous, staple fibers and fine scaly particles.

In order to ensure better mixing of the melt and removing gaseous inclusions, the blending chamber is positioned 1.2 to 2.5 m lower than the furnace bottom, from where the melt falls down vertically to horizontal plate of the blending chamber. As a result, the melt is mixed more intensively and gaseous inclusions are released more actively. The level of the melt in blending chamber is maintained 2.0-2.5 higher than in the furnace. This condition ensures constant hydrostatic pressure at the spinnerets and preserves heat, thus, bringing the process of producing the fibers closer to adiabatic conditions.

The proposed variants of production line are characterized in that the feeder is equipped with fittings for discharging the melt from the feeder. With a view to the fact that this technology comprises the use of high temperatures, the refractory materials of furnace, feeder blending chamber may be destroyed into particles, which are discharged outside through drain fittings located at the feeder edges in order to prevent their ingress to spinnerets.

Ball mill (BM), disintegrator (DI), and velocity layer apparatus (VLA) were used as the arrangement for mechanical-catalytical treatment of raw materials in the proposed variants of the production line.

BRIEF DESCRIPTION OF THE DRAWINGS

The essence of the invention is further explained by the drawings, where.

DESCRIPTION OF THE PREFERRED EMBODIMENT(S)

Each variant of the proposed production lines comprises tanks 1 for storing acidic rocks, dolomite, limestone and other components, heat exchanger 2, dosing unit 3, mechanical-catalytical activator 4, minerals loader 5, melting furnace 6, draining unit 7, draining fitting 8, adjustable valve 9, horizontal blending chamber 10, which includes inclined platform 11, accumulating pool 12 with barbotage nozzles 13 built in, burners 14, antifoam baffle 15, melt stabilization pool 16, feeder 17, working units 18, spinnerets with (plates) feeders 19, through which the continuous fibers (ContF), staple fibers (SF), and coarse fibers (CoarF) are drawn. Working units, feeder, blending chamber are further equipped with the heating systems 20. Heat exchanger 2 is connected with the furnace melting space 6 and horizontal blending chamber 10.

Figure 1:
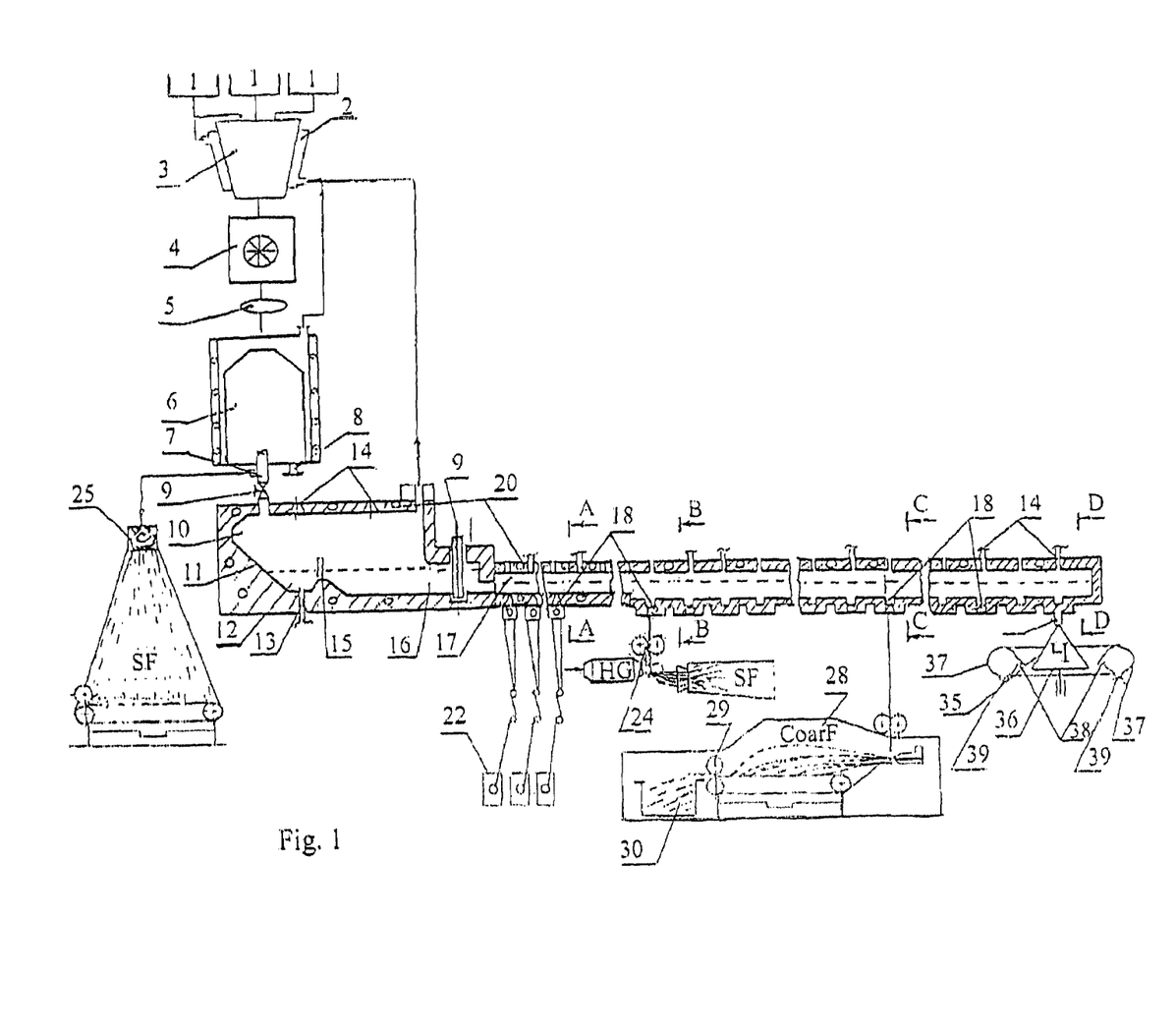
FIG. 1 schematically illustrates the proposed production line for producing high-silicate continuous, staple fibers and fine scaly particles of acidic rock minerals.
Figure 2:
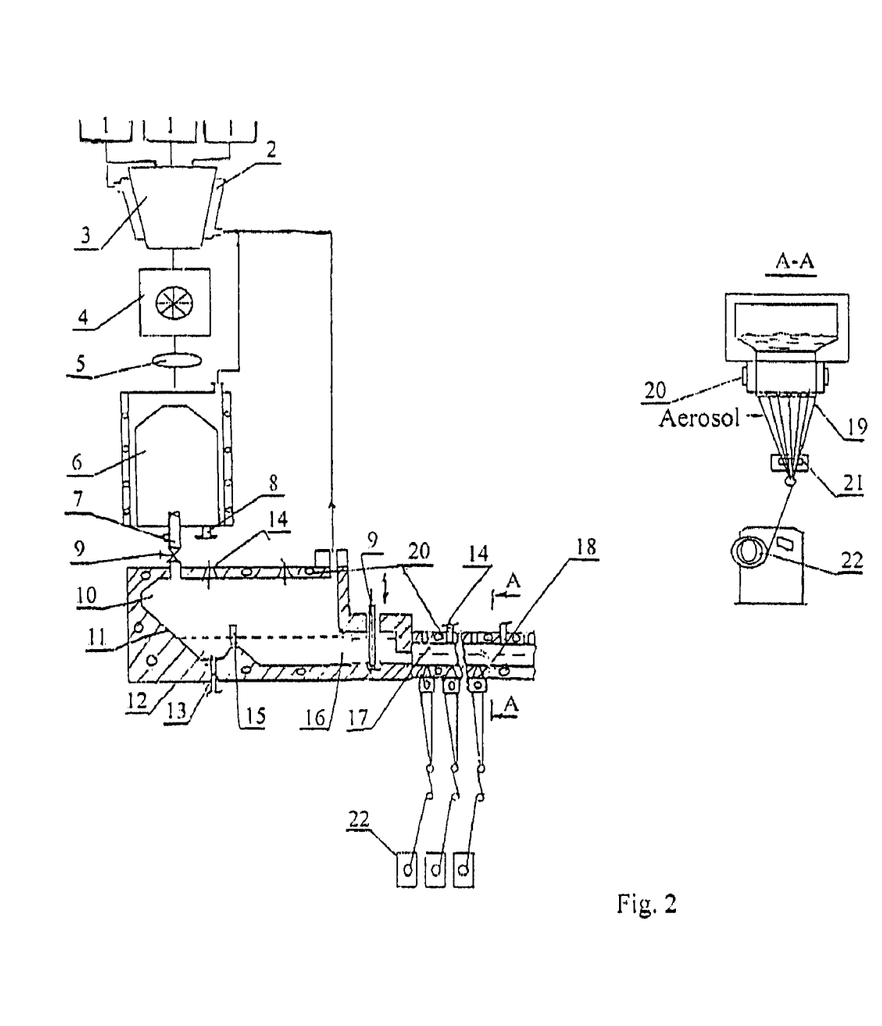
FIG. 2 schematically illustrates the production line for producing continuous fibers.
Figure 3:
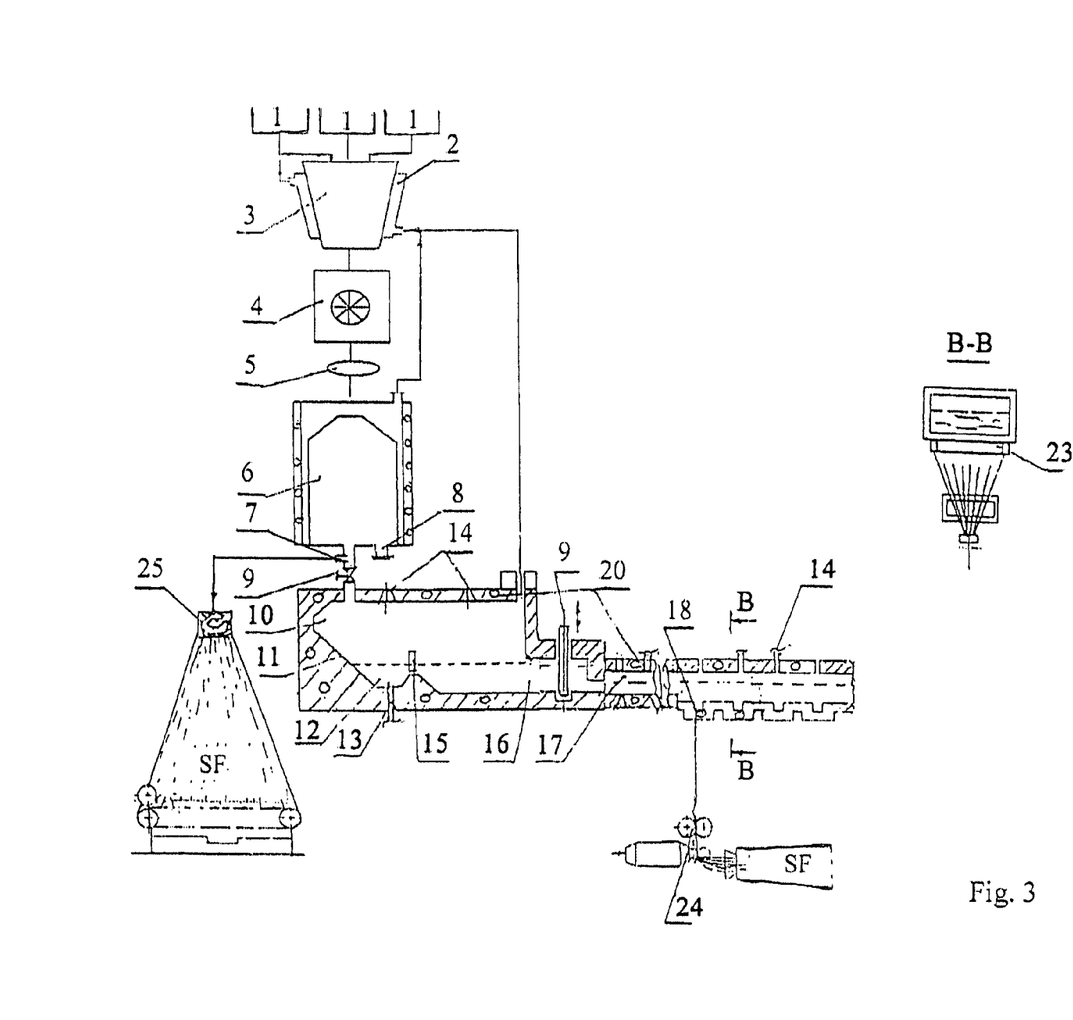
FIG. 3 schematically illustrates the production line for producing staple fibers.

In order to stabilize the process of fibers drawing the production line includes the arrangement for their treatment immediately upon exiting from the spinnerets by air-water helium sprays (not shown). For the purpose of ContF manufacturing the production line comprises the mechanism for applying the lubricant 21 onto the fibers and bobbin 22 for winding the fibers. For the purpose of SF production the spinneret plate 23 made of heat resistant alloy or ceramics is installed in the working unit. The melt level is maintained at the defined level over it, and primary fibers are drawn using the mechanism 24, then they are inflated by the hot gases stream (HG) to obtain SF. Also the staple fibers were obtained immediately upon preparing the melt in the furnace 6, which was fed to inflation head 25 and turned into SF.

Figure 4:
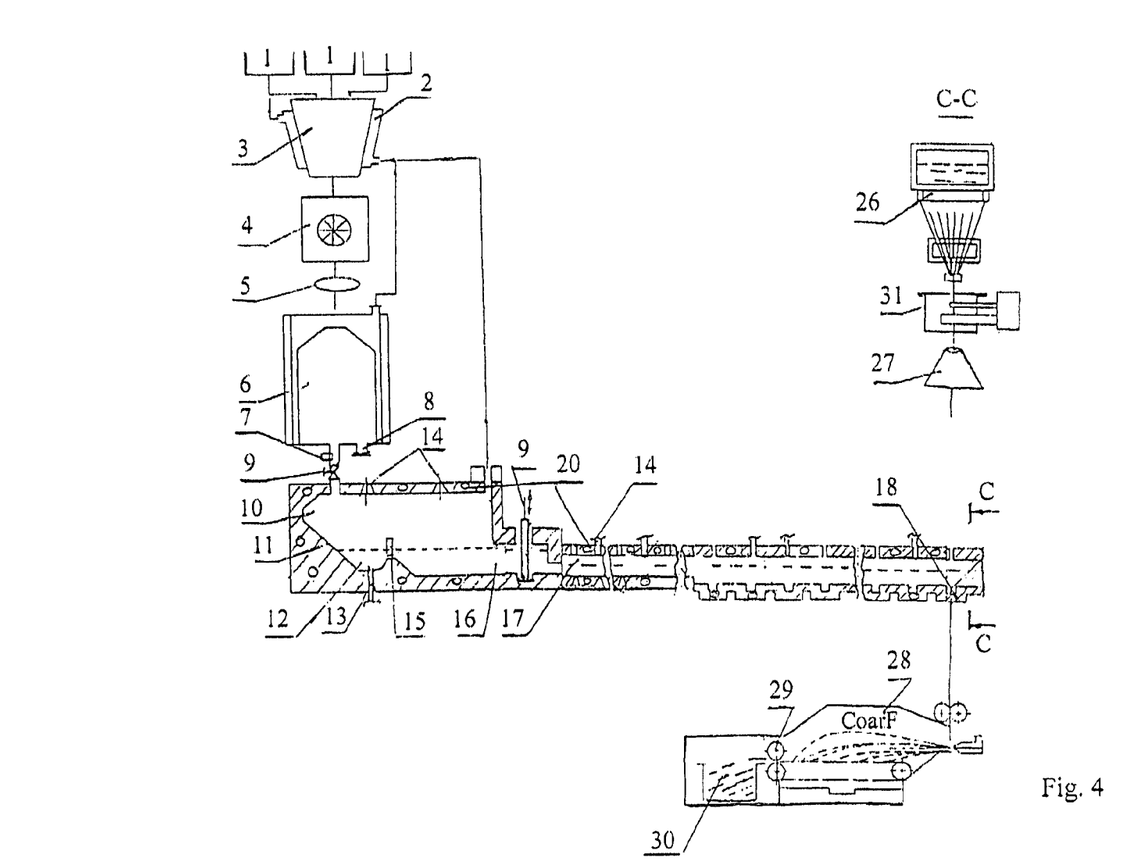
FIG. 4 schematically illustrates the production line for producing coarse fibers.

In order to obtain coarse fibers, heat resistant feeder 26 was also used. It was heated by electric current. Formed streams of melt are drawn into fibers by compressed air flow using a blower. Fiber-forming unit 27 has the shape of truncated pyramid. Coarse fibers are deposited in fiber deposition chamber 28 at the netting of the conveyor with breaking unit 29 located at its end. The unit 29 divides the CoarF into segments of the defined length, which are then packed in the packaging 30.

For the purpose of obtaining the CoarF of the specific diameter and length, which are used, for example, in concrete dispersed reinforcement, the working unit comprise adjustable valve that may be installed to corresponding melt level using electric drive.

In order to create a protective film on the CoarF surface, the fibers were chemically treated in the chamber 31.

Figure 5:
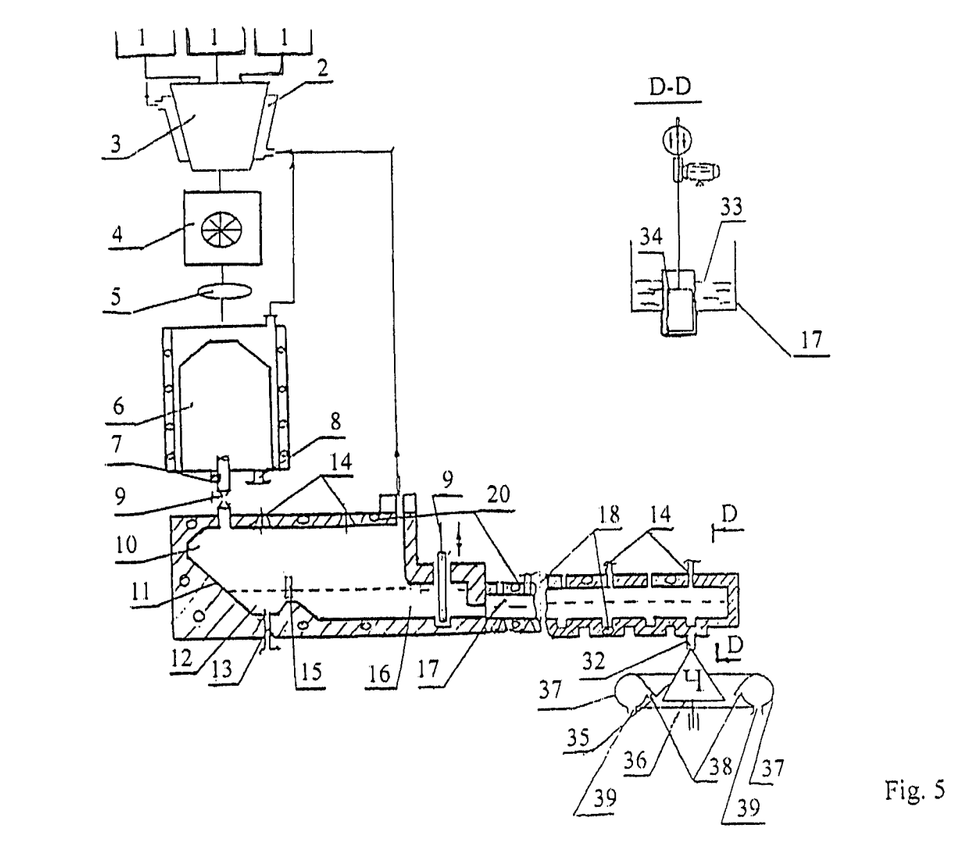
FIG. 5 schematically illustrates the production line for producing fine scaly particles.

Inorganic fine scaly particles (hereinafter referred to as "the scales") are produced using one of the fittings 32 for discharging the melt from the feeder with telescopic pipe 33 rigidly connected to such fitting, the second tube 34 is installed movable on the first pipe 33, the upper end of the second tube 34 is intended for intaking the melt from the feeder 17, and the first pipe 33 lower end is used for outputting the melt onto the working surface 35 of rotating fine forming element 36. Fine forming element 34 is made as a cone with the vertex oriented towards discharging orifice (fitting) 32.

The melt stream flows through the orifice 32 to working surface 35 of the rotating element 36, where, being influenced by centrifugal force, turns into a thin film. At the moment of melt moving in the form of thin film, said melt film hardens at the surface edge being influenced by gas flow from output 38 of ring blow head 37. Along with that (simultaneously) the gas stream, coming out of output 39, disperses the hardened film into many scaly particles. The particles thickness is regulated by means of a drive kinematically linked with the tube 34.

Ball mill ShM 900×1800 filled with quartz balls was used as the arrangement for mechanical-catalytical activation. In the process of drum rotation the balls rubs against its walls and rise to a certain height, then they fall freely crushing the raw material by kicks and attrition. The raw material may be fractured using wet or dry method. In the first case the suspension is freely poured though a hollow journal, and in the second case the crushed material, being influenced by the own weight, is unloaded though the journal to minerals loader 5. BM is used for the raw material modification by dolomite, limestone and their mixture as swell as other modificators, for example $Cr_2O_3$, which results in higher strength of high-silicate fibers obtained. This phenomenon may be explained by formation of modificator absorption layer on the minerals surface. Such layer facilitates formation of absorption and chemical bound between modificator and minerals particles.

Rocks are comprised of crystals having different granularity, i.e. druses. BM are usually utilized to destroy them. In a BM druses are kicked and rolled by balls and, thus, crushed.

Disintegrator was also used as the arrangement for mechanical-catalytical treatment of raw materials, where the raw material is crushed due to quick rotation of fingers. UDA type disintegrator enables creation of defects in the structure of mineral grains under high rotor RPMs, and such defects result in higher furnace charge reactivity and shorter melting time. During raw materials crushing in disintegrator mechanical-chemical processes occur not only on freshly formed surfaces but also in the volume of crystals crushed. These processes primarily cause formation of a big number of vacancies that lead to altering of a number of physical (mechanical) and chemical properties of crushed crystals. For instance, the melting point and solubility of acidic rock crystals decrease. Mechanical-catalytical treatment results in formation of not merely a crushed substance with the same characteristics as original one, but rather a new substance having different physical and physicochemical properties.

Mechanical-catalytical treatment of raw materials was also performed in velocity layer apparatus (VLA), where crushing and activation are attained by using metal solids rotating in a magnetic field. Big $SiO_2$ particles would become crystallization centers in the melt and tension concentrators in the future product. Therefore, $SiO_2$ crushing in VLA results in activation not only due to increasing of specific surface area but also due to more lattice imperfection. In fact, the activity grows not only at the surface but in the particles volume, too, which is attributable to formation of so called "active lattice" as a result of breaking Si—O bound. Ultimately, this shortens the melting time and improves the fibers strength and homogeneity. It was found that mechanical activation results in decreasing of solid phase reactions temperature and performing reactions, which were not observed without activation. Mechanical-catalytical treatment of acidic rocks decreases the melting temperature, accelerates the process of producing glass melt homogenous in terms of contents and temperature, and, thus, enables preparing of the melt for obtaining high-silicate inorganic fibers having excellent properties.

EXAMPLE 1

Continuous fiber production. Dacite (D) was used as a rock. Prior to D loading to the melting furnace 6 (see FIG. 2) it was heated up to the temperature 810° C. on the average and kept at this temperature during 10 minutes on the average until removal of chemically bound water and burning up organic components. Then the raw material was loaded to disintegrator 4, fractured to 15 μm size and gradually fed to the furnace 6 through loader 5. In the furnace the material was heated up to the temperature 2150° C. in order to obtain anorphous (96%) melt. Not melted particles (mostly, quartzites) were discharged though fitting 8. Further homogenization and stabilization of the melt were performed in the blending chamber 10 and feeder 17 at the temperature 1420 to 1710° C. After that the melt was fed to working unit 18 located over spinnerets 19, through which the continuous fibers were drawn. The fibers obtained were lubricated using roll arrangement 21. Then the fibers were wound onto bobbins 22. The samples of fibers were taken and tested to determine their strength, heat resistance. The fibers diameter was measured according to GOST [State Standard] 6943.2-79, tensile tests were performed subject to GOST 6943.5-79. The fibers chemical resistance to HCl 2 N solution was determined by measuring the mass lost from the 5 000 sq.cm surface after 3 hours of boiling. The test results are summarized in Table 2. The test results have shown that the continuous fibers produced according to the proposed method on the proposed production line have higher tensile strength, heat and chemical resistance compared to fibers obtained using the prior art method.

EXAMPLE 2

Continuous fiber production. The operations described in the Example 1 were performed except that rhyodacite was used as raw material. The properties of produced continuous fibers are presented in Table 2. The data clearly indicate that the fibers obtained excels the prior art fibers in a number of characteristics.

EXAMPLE 3

Continuous fiber production. Granite was used as a raw material. Prior to granite loading to the melting furnace 6 it was heated up to the temperature 950° C. and kept at this temperature during 25 minutes until fracturing of conglomerates and removal of water vapors and carbon oxide. Then the raw material was subjected to mechanical-catalytical activation in disintegrator 4 until the particles of not more that 10 μm in size were obtained. Obtained material was heated in the furnace 6 up to the temperature 2450° C. to yield amorphous melt containing no particles of unmelted mineral phases. Homogenization and stabilization were performed in the horizontal blending chamber and feeder at the temperature 1500 to 1750° C. After that the melt was fed to working unit 18, where feeders with spinnerets 19 were installed. Continuous fibers were drawn through the spinnerets.

The continuous fiber so obtained was tested to determine its strength, chemical and thermal resistance. The test results are given in Table 2. The data contained in Table 2 indicate that fibers obtained of granite have characteristics not worse than those of fibers according to the state of the art.

EXAMPLE 4

Continuous fiber production. The operations described in the Example 3 were performed except that rhyolite was used as raw material. Specifications of continuous fibers produced are presented in Table 2.

EXAMPLE 5

Continuous fiber production. The raw material used was a rock comprising mostly sand with silicon oxide content equal or exceeding 73%. Sand ratio in the rock was 60 to 95% w/w, rest of material was a mixture of limestone and dolomite. The optimum mixture was one containing 70 to 90% w/w of sand, and the most preferred mixture had sand content 75 to 85% w/w. Amount of limestone and dolomite mixture is 5 to 40% w/w. Desirable proportion of limestone and dolomite mixture is 10 to 30% w/w, while the most preferred range is 15 to 25% w/w. Usually the mixture contains 12 to 40% w/w of limestone and 2 to 15% w/w of dolomite. It is desirable for these mixtures to contain 14 to 30% w/w of limestone and 3 to 12% w/w of dolomite. The most preferred ranges are 15 to 25% w/w and 4 to 11% w/w, correspondingly. Prepared furnace charge was heated up to the temperature 350° C. and dried during 40 minutes in order to remove hydrotechnical water and gaseous inclusions. Than the raw material was subjected to mechanical-catalytical activation in velocity layer apparatus 4 until the particles of not more than 5 μm in size were obtained. After that the raw material was heated in furnace 6 up to the temperature 2380° C. and kept at this temperature until rock grains, crystals were destroyed and amorphous melt was obtained. Melt homogenization and stabilization were performed in horizontal blending chamber and feeder at the temperature 1440 to 1730° C. until the melt, having viscosity 160 decipoise, was produced. Then the melt flowed to the working unit installed over spinnerets, from which the continuous high-silicate fiber was drawn.

Physicochemical properties of inorganic fibers produced of modified sands are presented in Table 2. The data indicate that the fibers obtained are not yielding to fibers obtained according to the state of the art method.

EXAMPLE 6

Staple fibers production. The operations described in the Example 1 were performed except that, starting from the stage of fibers drawing from spinneret plate 23 using special mechanism 24, the fibers were inflated by hot gases stream to become staple fibers (see FIG. 3). Specifications of high-silicate staple fibers produced are presented in Table 3.

EXAMPLE 7

Staple fibers production. The operations described in the Example 6 were performed except that rhyodacite was used as raw material. Specifications of staple fibers obtained are presented in Table 3.

EXAMPLE 8

Staple fibers production. The operations described in the Example 6 were performed except that granite was used as raw material. Properties of high-silicate staple fibers produced are presented in Table 3.

EXAMPLE 9

Staple fibers production. The operations described in the Example 6 were performed except that rhyolite was used as raw material. Results are given in Table 3.

EXAMPLE 10

Staple fibers production. The operations described in the Example 6 were performed except that raw material used was a furnace charge containing 75 to 85% w/w of sand with $SiO_2$ content equal or exceeding 73%, 15 to 25% w/w of limestone and 4 to 11% w/w of dolomite. Results are given in Table 3.

EXAMPLE 11

Coarse fibers production. The operations described in the Example 1 were performed except that, starting from the fiber drawing stage, the formed streams of melt are drawn into fibers by compressed air flow using a blower 27 (see FIG. 4). Coarse fibers were deposited in fiber deposition chamber 28 and broken into segments of specific length in the unit 29. Technical data for high-silicate coarse fibers produced are presented in Table 4. The data contained in Table 4 indicate that coarse fibers obtained have characteristics not worse than those of fibers produced using the state of the art method.

EXAMPLE 12

Coarse fibers production. The operations described in the Example 11 were performed except that rhyodacite was used as raw material. Specifications of coarse fibers obtained are presented in Table 4.

EXAMPLE 13

Coarse fibers production. The operations described in the Example 11 were performed except that granite was used as raw material. Technical data for coarse fibers produced are presented in Table 4.

EXAMPLE 14

Coarse fibers production. The operations described in the Example 11 were performed except that rhyolite was used as raw material. Results are given in Table 4.

EXAMPLE 15

Coarse fibers production. The operations described in the Example 11 were performed except that furnace charge consisting of sand and mixture of limestone and dolomite was used as raw material. Specifications of coarse fibers produced are presented in Table 4.

EXAMPLE 16

Fine scaly particles production. To produce fine scaly particles, the operations described in Example 1 were performed except that the melt stream through the orifice 32 was fed to the working surface 35 of the rotating element 36, where, being influenced by centrifugal force, the stream turned into a thin film. At the moment of melt moving from the rotating element, the melt in the form of thin film was dispersed into many scaly particles using the ring blow head. Technical data for high-silicate scaly particles produced of dacite are presented in Table 5. The data contained in Table 5 indicate that scaly particles obtained have characteristics not worse than those of scaly particles produced using the state of the art method.

EXAMPLE 17

Fine scaly particles production. The operations described in the Example 16 were performed except that rhyodacite was used as raw material. Specifications of scaly particles produced are presented in Table 5.

EXAMPLE 18

Fine scaly particles production. The operations described in the Example 16 were performed except that granite was used as raw material. Technical data of scaly particles produced of granite are presented in Table 5.

EXAMPLE 19

Fine scaly particles production. The operations described in the Example 16 were performed except that rhyolite was used as raw material. The test results are given in Table 5.

EXAMPLE 20

Fine scaly particles production. The operations described in the Example 12 were performed except that furnace charge consisting of sand and mixture of limestone and dolomite was used as raw material. The experiments carried out enabled to attain increase in output of fine particles of the given fraction. The particles thickness was regulated by way of changing the melt level fed to the working surface 35 of the rotating element 36 with the use of electric drive kinematically linked to the tube 34 intended for intaking the melt from the feeder 17. Deviation K of particles diameter is determined as a ratio of particle ellipse minor axis to its major axis. Specifications of scaly particles produced are presented in Table 5.

The continuous, staple, coarse fibers and scaly particles so obtained were tested to determine their acid and thermal resistance and tensile strength. The test results are given in Tables 2, 3, 4 and 5.

The test results have shown that the products obtained according to the proposed methods on the proposed production lines have approximately 15-32% higher acid resistance and tensile strength compared to products obtained using the prior art methods. These characteristics were attained due to creation of conditions for removal of high melting temperature inclusions from the melts.

The proposed inventions may be used in operations with other minerals (ultrabasic, basic, medium and sand varieties) with temperatures of material subjected to drawing not exceeding the temperatures indicated in the present invention.

TABLE 1

| No. | Rock description | Samples quantity | $SiO_2$ | $Al_2O_3$ | $Fe_2O_3$ | FeO | $TiO_2$ | MnO |
|---|---|---|---|---|---|---|---|---|
| | | | Limit chemical component contents in the rock, in % w/w | | | | | |
| | | | Average chemical component contents, in % w/w | | | | | |
| 1 | Dacite | 6 | 67.80-68.95 | 15.36-15.48 | 1.97-2.16 | 2.07-2.97 | 0.41-0.43 | 0.07-0.11 |
| | | | 67.9 | 15.4 | 2.08 | 2.37 | 0.42 | 0.09 |
| 2 | Rhyodacite | 5 | 68.52-71.9 | 14.6-15.1 | 0.91-1.85 | 1.24-1.92 | 0.25-0.52 | 0.12-0.18 |
| | | | 71.2 | 14.9 | 1.79 | 1.69 | 0.37 | 0.17 |
| 3 | Granite | 6 | 70.18-72.83 | 14.1-15.2 | 0.18-2.52 | 0.62-2.12 | 0.19-0.49 | 0.08-0.1 |
| | | | 72.12 | 14.75 | 1.32 | 1.52 | 0.31 | 0.095 |
| 4 | Rhyolite | 5 | 73.01-77.42 | 12.92-14.91 | 1.05-1.35 | 0.52-1.95 | 0.08-0.29 | 0.03-0.08 |
| | | | 74.34 | 13.98 | 1.04 | 0.68 | 0.19 | 0.04 |
| 5 | Sand from Didivskyi deposit | 12 | 88.3-96.8 | — | — | — | — | — |
| | | | 95.8 | | | | | |

| No. | CaO | MgO | $K_2O$ | $Na_2O$ | $SO_3$ | $P_2O_5$ | other | Total |
|---|---|---|---|---|---|---|---|---|
| | Limit chemical component contents in the rock, in % w/w | | | | | | | |
| | Average chemical component contents, in % w/w | | | | | | | |
| 1 | 3.6-3.63 | 0.93-1.24 | 2.83-2.96 | 2.94-3.08 | 0.1-0.2 | 0.1 | 0.49-0.69 | |
| | 3.61 | 1.04 | 2.88 | 2.99 | 0.13 | 0.1 | 0.58 | 99.6 |
| 2 | 0.49-3.09 | 0.59-1.81 | 2.81-5.89 | 1.79-4.81 | 0.019 | 0.021 | 0.16-0.51 | |
| | 1.92 | 1.19 | 3.59 | 3.05 | 0.019 | 0.021 | 0.29 | 100.2 |
| 3 | 0.51-2.99 | 0.47-1.21 | 2.88-6.01 | 1.7-4.55 | 0.01 | traces | 0.39-0.74 | |
| | 1.79 | 0.98 | 4.05 | 2.98 | 0.01 | | 0.5 | 100.4 |
| 4 | 0.41-1.84 | 0.61-0.98 | 3.31-3.91 | 2.14-4.14 | traces | 0.01 | 0.65-1.0 | |
| | 1.41 | 0.41 | 3.11 | 3.97 | | 0.01 | 0.83 | 100 |
| 5 | — | — | 0.1-0.98 | 0.09-0.81 | 0.04-0.6 | — | 1.44-1.59 | |
| | | | 0.89 | 0.75 | 0.58 | | 1.51 | 99.64 |

TABLE 2

| No. | Rock description | Fiber diameter, in μm | Tensile strength, in MPa | Chemical resistance in 2N HCl (98° C., 3 hours), in % | Utilization temperature, in ° C. |
|---|---|---|---|---|---|
| 1 | Dacite [1] | 5.6-12.4 | 2490 | 92 | 700-865 |
| 2 | Rhyodacite [2] | 5.3-12.7 | 2550 | 92.8 | 720-880 |
| 3 | Granite [3] | 5.5-11.8 | 2610 | 93.7 | 750-920 |

TABLE 2-continued

| No. | Rock description | Fiber diameter, in μm | Tensile strength, in MPa | Chemical resistance in 2N HCl (98° C., 3 hours), in % | Utilization temperature, in ° C. |
|---|---|---|---|---|---|
| 4 | Rhyolite [4] | 4.7-12.5 | 3115 | 95.2 | 880-1050 |
| 5 | Sands with SiO₂ content ≧ 73%, [5] | 3.8-13.8 | 2350 | 91.1 | 600-720 |
| 6 | State of the art | 5.8 | 2300 | 90.8 | 600-710 |

TABLE 3

| | | Rock description (number) | | | | | State of the |
|---|---|---|---|---|---|---|---|
| No. | Staple fiber properties | 1 | 2 | 3 | 4 | 5 | art |
| 1 | Fiber length, in mm | 10-45 | 12-40 | 15-42 | 12-44 | 10-40 | 10-40 |
| 2 | Non-fibrous inclusions quantity, in % | 1.9-4.8 | 2.0-4.9 | 1.9-4.8 | 1.8-5.0 | 2.0-4.9 | 2-5 |
| 3 | Utilization temperature, in ° C. | 865 | 880 | 920 | 1050 | 855* | 700 |
| 4 | Hygroscopicity, in % | 0.45 | 0.41 | 0.35 | 0.2 | 0.88 | 1 |

*Short-term

TABLE 4

| | | Rock description (number) | | | | | Known TU [Technical |
|---|---|---|---|---|---|---|---|
| No. | Coarse fiber properties | 1 | 2 | 3 | 4 | 5 | specifications] 023.005-89 |
| 1 | Fiber diameter, in μm | 130 | 135 | 125 | 120 | 110 | 115 + 35 |
| 2 | Length, in mm | 70 | 75 | 70 | 75 | 70 | 75 + 25 |
| 3 | Tensile strength, in MPa | 285 | 287 | 295 | 305 | 210 | 200 |
| 4 | Alkali resistance, in %, not less than | 93.1 | 92.5 | 92.1 | 91.7 | 90.5 | 90 |

TABLE 5

| | | Rock description (number) | | | | | State of |
|---|---|---|---|---|---|---|---|
| No. | Scaly particles properties | 1 | 2 | 3 | 4 | 5 | the art |
| 1 | Thickness scattering for 100 particles, in μm, up to | 2.8 | 2.9 | 2.9 | 2.8 | 3 | 3 |
| 2 | Deviation, K | 0.85-0.96 | 0.81-0.96 | 0.83-0.95 | 0.84-0.95 | 0.81-0.95 | 0.8-0.95 |
| 3 | Resistance in 2N HCl (98° C., 3 hours), in % | 91.8 | 92.1 | 93.1 | 95.3 | 90.9 | 77.6** |

**Berestovetsk basal deposit

The invention claimed is:

1. The method of producing continuous inorganic fibers of rock, comprising operations of:
    loading fractured rocks to a melting furnace,
    melting the rocks to produce a melt,
    homogenizing the melt,
    further stabilizing the melt in a melting furnace feeder,
    drawing a fiber, and
    lubricating and winding the fiber onto a bobbin,
    wherein dacite or rhyodacite is used as a rock, prior to loading to the melting furnace the rock is heated up to temperature between 700 and 910 ° C., kept at this temperature during 5 to 15 minutes until removal of chemically bound water and burning up organic components, then the rock is subjected to mechanical-catalytical activation until obtaining particles of not more than 15 μm in size and is heated to temperature between 2105 and 2200 ° C. until obtaining the melt with amorphism degree of not less than 96% and isolation of not melted quartzites from the melt, further homogenization and stabilization of the melt are performed at the temperature 1420 to 1710 ° C. until obtaining the melt with viscosity being not less than 130 decipoise, and fibers are drawn from the melt below a surface thereof.

* * * * *